United States Patent
Stephenson et al.

(10) Patent No.: US 10,174,607 B2
(45) Date of Patent: Jan. 8, 2019

(54) AUTOMATICALLY TRACKING UTILIZATION OF WELLBORE SERVICING EQUIPMENT

(71) Applicant: Halliburton Energy Services, Inc., Houston, TX (US)

(72) Inventors: Stanley V. Stephenson, Duncan, OK (US); David M. Stribling, Duncan, OK (US); Stephen Crain, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/036,345

(22) PCT Filed: Dec. 17, 2013

(86) PCT No.: PCT/US2013/075818
§ 371 (c)(1),
(2) Date: May 12, 2016

(87) PCT Pub. No.: WO2015/094190
PCT Pub. Date: Jun. 25, 2015

(65) Prior Publication Data
US 2016/0290127 A1 Oct. 6, 2016

(51) Int. Cl.
*E21B 47/12* (2012.01)
*E21B 41/00* (2006.01)
*G06Q 10/00* (2012.01)
*G06K 7/10* (2006.01)

(52) U.S. Cl.
CPC .......... *E21B 47/122* (2013.01); *E21B 41/00* (2013.01); *G06K 7/10366* (2013.01); *G06Q 10/20* (2013.01)

(58) Field of Classification Search
CPC ...... E21B 47/122; E21B 41/00; E21B 17/006; E21B 44/00; E21B 47/12; E21B 47/09; E21B 10/00; E21B 44/005
See application file for complete search history.

(56) References Cited

U.S. PATENT DOCUMENTS

| | | | |
|---|---|---|---|
| 2009/0151939 A1 | 6/2009 | Bailey et al. | |
| 2009/0205820 A1* | 8/2009 | Koederitz | E21B 10/00 166/250.01 |
| 2009/0211754 A1 | 8/2009 | Verret et al. | |
| 2011/0052423 A1* | 3/2011 | Gambier | F04B 49/065 417/63 |
| 2011/0148603 A1 | 6/2011 | Denny et al. | |
| 2012/0273192 A1 | 11/2012 | Schmidt et al. | |
| 2013/0090856 A1 | 4/2013 | Godager | |

OTHER PUBLICATIONS

International Search Report and Written Opinion issued in related PCT Application No. PCT/US2013/075818 dated Sep. 17, 2014, 12 pages.

* cited by examiner

*Primary Examiner* — Kabir A Timory
(74) *Attorney, Agent, or Firm* — John Wustenberg; Baker Botts L.L.P.

(57) ABSTRACT

Systems and methods of automatically tracking the utilization of a piece of wellbore servicing equipment are disclosed. The system includes an identification tag coupled to the wellbore servicing equipment. The system further includes one or more identification antennas located in close proximity to the identification tag and one or more identification tag readers for receiving one or more signals from the one or more identification antennas.

20 Claims, 1 Drawing Sheet

AUTOMATICALLY TRACKING UTILIZATION OF WELLBORE SERVICING EQUIPMENT

CROSS-REFERENCE TO RELATED APPLICATION

The present application is a U.S. National Stage Application of International Application No. PCT/US2013/075818 filed Dec. 17, 2013, which is incorporated herein by reference in its entirety for all purposes.

BACKGROUND

The present invention relates generally to operations performed and equipment utilized in conjunction with wellbore operations and, in particular, systems and methods for servicing a wellbore and wellbore servicing equipment.

A wellbore servicing system may include wellbore servicing equipment, such as a trailer or truck, an engine, a transmission, a pump, a power end on the pump, and a fluid end on the pump. Wellbore servicing equipment failures may occur during performance of a wellbore servicing operation. Such equipment failures may result in a variety of problems including, among other things, causing inconvenient time delays in performing the wellbore servicing operation, unexpected and/or undesirable timing and expense of equipment repairs, and/or damage to the wellbore and the associated subterranean formation being treated in the wellbore servicing operation. Further, since the wellbore servicing equipment may fail while being used for a wellbore servicing operation, it is not uncommon to mobilize more equipment than needed for the treatment to ensure sufficient equipment is available if there are any wellbore servicing equipment failures during the treatment.

In some cases, all mobilized pumping equipment may be used at relatively lower loads, but if some pumping equipment fails, the loads on at least some of the remaining pumping equipment may be increased. In other cases, some of the pumping equipment may be left offline until needed due to a failure of other pumping equipment. While mobilizing additional wellbore servicing equipment to a particular wellbore servicing operation may provide relief when some equipment fails, current systems and methods of selecting equipment may lead to provisioning too little or too much equipment for a wellbore servicing operation. Providing too much or too little for a wellbore servicing operation may result in increased cost of the wellbore servicing operation and/or a misappropriation of equipment such that the additional equipment is not well utilized.

A wellbore servicing system may also include methods of calculating remaining life estimates of the wellbore servicing equipment and/or probability of survival estimates for the wellbore servicing equipment. This may be done by gathering usage and load information from the well servicing equipment in the field, collecting the data in a central repository, analyzing the data, and using the resulting data analysis to track utilization of wellbore servicing equipment to predict equipment maintenance schedules, plan for future equipment needs, prepare for equipment obsolescence, and other similar tasks. Tracking utilization of wellbore servicing equipment is at least in part dependent on the installation data of the equipment to accurately measure the utilization and remaining life of the equipment. Currently, tracking installation data is dependent on accurate and timely manual entries of installation dates into the central repository. In addition, when a piece of equipment is moved, e.g., from one pumping unit to another, it is increasingly difficult to keep track of the install data for that piece of equipment.

Figure 1:
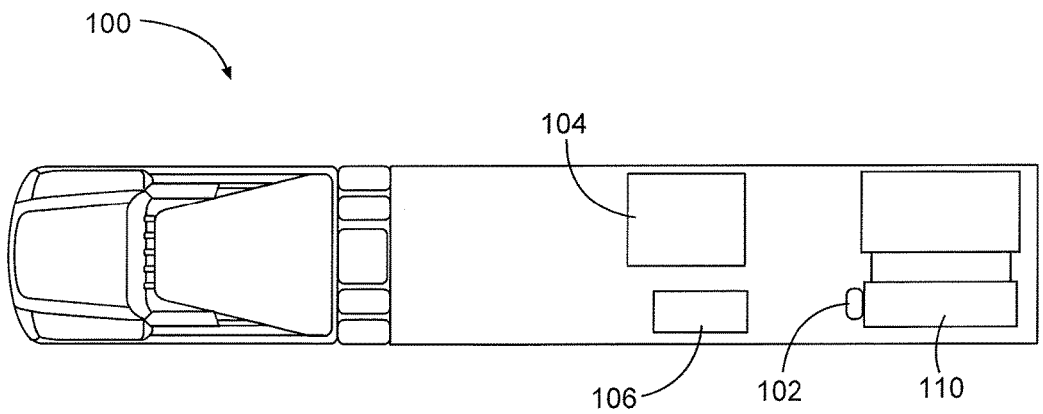
FIG. 1 illustrates a cross-sectional view of schematic showing a system for tracking the utilization of wellbore servicing equipment in accordance with an embodiment of the present disclosure.

While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION OF THE DRAWINGS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells. Embodiments described below with respect to one implementation are not intended to be limiting.

The terms "couple" or "couples" as used herein are intended to mean either an indirect or a direct connection. Thus, if a first device couples to a second device, that connection may be through a direct connection, or through an indirect mechanical, acoustical, or electrical connection via other devices and connections.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory ("RAM"), one or more processing resources such as a central processing units ("CPUs") or computer processor cores or hardware or software control logic, read-only memory ("ROM"), and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

As would be appreciated by those of ordinary skill in the art, with the benefit of this disclosure, one or more information handling systems may be used to implement the methods disclosed herein. Specifically, the one or more information handling systems may include machine-readable instructions to perform the methods disclosed herein. In certain embodiments, the different information handling systems may be communicatively coupled through a wired or wireless system to facilitate data transmission between the different subsystems. The structure and operation of such wired or wireless communication systems is well known to those of ordinary skill in the art having the benefit of the present disclosure and will therefore, not be discussed in detail herein. Moreover, each information handling system may include storage media and/or memory and may be any computer-readable media that stores data either permanently or temporarily.

For the purposes of this disclosure, storage media and/or memory may include any one or a combination of volatile or nonvolatile local or remote devices suitable for storing information. For example, storage media and/or memory may include a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), a solid state drive ("SSD"), flash memory, magnetic storage devices, optical storage devices, network storage devices, cloud storage devices, or any other suitable information storage device or a combination of these devices.

The present application relates generally to operations performed and equipment utilized in conjunction with wellbore operations and, in particular, systems and methods for servicing a wellbore and wellbore servicing equipment. Specifically, the present disclosure provides systems and methods for improved tracking of the utilization of wellbore servicing equipment of a wellbore servicing system. Generally, the utilization of wellbore servicing equipment may be tracked by considering a "remaining life" estimate of the equipment or a "probability of survival" estimate of the equipment. It will be understood that the term "wellbore servicing equipment" or "wellbore servicing system" is not intended to limit the use of the equipment and processes described with those terms to servicing a wellbore. Further, the "remaining life" estimate and the "probability of survival" estimate referred to above are terms that are closely tied to results achievable through the methods most clearly explained in the presentation materials titled "Weibull Analysis of Failures with Different Stress Histories," which was authored by Mr. Stanley Stephenson and presented in 2006 at an Applied Reliability Symposium held in Orlando, Fla., as well as U.S. Pat. No. 8,347,957, by Stanley Stephenson et al. The "Weibull Analysis of Failures with Different Stress Histories" presentation material and U.S. Pat. No. 8,347,957 are hereby incorporated by reference in their entirety and may be referred to specifically when helpful to aid understanding of the present disclosure. For example, calculations relating to "remaining life" estimates and/or "probability of survival" estimates may be carried out within, and/or on an information handling system storing one or more databases, including a central repository.

It will be appreciated that the present disclosure may be used in conjunction with equipment, systems, and/or methods utilized to gather equipment usage records based on certain variables, such as installation date. For example, Halliburton's Automatic Control Equipment ("ACE") software is currently being used in the field to control Halliburton High Pressure Pumping units and has built-in features to gather, aggregate, and save statistical usage information. The present disclosure provides systems and methods for automatically tracking the utilization of wellbore servicing equipment by attaching an identification tag to one or more pieces of wellbore servicing equipment. In a preferred embodiment, as will be discussed below within the context of this disclosure, the identification tag may be a Radio Frequency Identification ("RFID") tag. While this disclosure discusses the systems and methods disclosed herein in the context of an RFID tag, this disclosure is not intended to be limiting. Any other suitable identification tag known to those of ordinary skill in the art may be used without departing from the scope of this disclosure, including, but not limited to, hardware devices, such as a USB drive.

As would be appreciated by one of ordinary skill in the art with benefit of the present disclosure, the identification tag may send equipment identifying information (in certain embodiments, in the form of a unique identification code of the identification tag itself) to one or more identification antennas, which may be coupled to one or more identification tag readers, and may transmit the equipment identifying information to the one or more identification tag readers. The identification tag readers may be located anywhere on or near the equipment, and may be connected to an ACE computer. The identification tag may in some embodiments comprise a chip or other electronic device suitable for storing identification information unique to the tag, and it may further include means of transmitting such information, and/or means for allowing such information to be read, scanned, or otherwise received by another device. For example, the identification tag may comprise any commercially available RFID chip or tag.

Referring now to the figures, FIG. 1 illustrates a cross-sectional view of a schematic showing a system 100 for tracking the utilization of wellbore servicing equipment 110 in accordance with an embodiment of the present disclosure. The system 100 may include one or more identification tags. In the illustrative embodiment shown in FIGS. 1 and 2, the system 100 may specifically include one or more RFID tags 102. The system 100 may further include one or more identification tag readers and an information handling system 106. In the illustrative embodiment shown in FIGS. 1 and 2, the system 100 may specifically include at least one RFID tag reader 104 The system 100 may further include one or more databases, including a central repository (not shown), which may store one or more unit utilization files (not shown). The one or more databases may be stored within and/or on the information handling system 106. Each pump (i.e., unit) may have its own unit utilization file. The unit utilization files may include a unique identification code of the RFID tag 102, discussed in detail below, information related to the pump, such as revolutions turned and total volume of fluid pumped, and an end of life estimate and/or a probability of failure estimate associated with the piece of wellbore servicing equipment. The unit utilization files may be accessed from the central repository.

Each RFID tag 102 may include certain equipment identifying information. The equipment identifying information may include the unique identification code of the RFID tag 102. Each RFID tag 102 may be coupled to a piece of wellbore servicing equipment 110. In some embodiments, the RFID tag 102 may be coupled to the surface of the piece of wellbore servicing equipment 110. In other embodiments, the RFID tag may be located within or otherwise incorporated within the piece of wellbore servicing equipment 110. For example, such coupling may be through physical attachment of the RFID tag 102 to the piece of wellbore servicing equipment 110—such as strapping the RFID tag 102 to the piece of wellbore servicing equipment 110 via one or more straps; embedding the RFID tag 102 in the piece of wellbore servicing equipment 110 by installing the RFID tag 102 in a hole, depression, or other surface location in or on the piece of wellbore servicing equipment 110; adhering the RFID tag 102 to the piece of wellbore servicing equipment 110 using adhesive (e.g., commercially available adhesive); or through any other means for physically connecting the RFID tag 102 to its associated piece of wellbore servicing equipment 110.

Each RFID tag 102 may comprise a unique identification code, which may be assigned to the RFID tag 102 by its manufacturer. The unique identification code may uniquely identify the piece of wellbore servicing equipment 110 to which the RFID tag 102 is coupled. In some embodiments, the unique identification code may enable association of the RFID tag 102 with the specific piece of equipment to which the RFID tag 102 is coupled. This may be done, for example, by associating the unique identification code with any one or more pieces of unique identifying information of the piece of wellbore servicing equipment 110 (e.g., equipment serial number, equipment manufacturer, equipment model number, etc.). Such association in some embodiments may be carried out in any one or more databases, including a central repository (not shown)—for example, by including within a single database entry (i) the unique identification code and (ii) the one or more pieces of unique identifying information for the piece of wellbore servicing equipment 110, such that look-up in a database of either (i) the unique identification code or (ii) the one or more pieces of unique identifying information for the piece of wellbore servicing equipment 110 may return the single database entry (and all associated information). In yet other embodiments, association of the unique identification code with any one or more pieces of unique identifying information of the piece of wellbore servicing equipment 110 may be carried out by embedding the unique identifying information of the wellbore servicing equipment 110 within the unique identification code of the associated RFID tag 102. As would be appreciated by one of ordinary skill in the art with the benefit of the present disclosure, association of the unique identification code with any one or more pieces of unique identifying information of the piece of wellbore servicing equipment 110 may be accomplished by any suitable means, with or without a database. Example embodiments including databases have been discussed herein for illustrative purposes, and are not meant to indicate the only means of association according to the present disclosure.

As would be understood by one of skill in the art with the benefit of the present disclosure, wellbore servicing equipment 110 may include any and all equipment used to service a wellbore, including, but not limited to, a trailer or truck, an engine, a transmission, a pump, a power end on a pump, a fluid end on a pump, or any other piece of wellbore servicing equipment known to one of ordinary skill in the art. While FIG. 1 illustrates the RFID tag 102 coupled to a fluid end, this disclosure is not intended to be limiting.

In certain embodiments in accordance with the present disclosure, the RFID tag reader 104 may be a standard warehouse RFID scanner with an RFID antenna attachment or any other handheld device capable of reading the RFID tag 102. For example, the RFID tag reader 104 may be a Motorola 9090z or a Motorola 9190z. In certain embodiments in accordance with the present disclosure, the information handling system 106 may be an ACE computer. The RFID tag reader 104 may be coupled to the information handling system 106 via wired or wireless connection. The RFID tag reader 104 may be located within the information handling system 106. The RFID tag reader 104 may read the unique identification code of each RFID tag 102, which the RFID tag reader 104 may use to identify that specific RFID tag 102, and thus the unique identifying information for the specific piece of wellbore servicing equipment 110 associated with that particular RFID tag 102.

Figure 2:
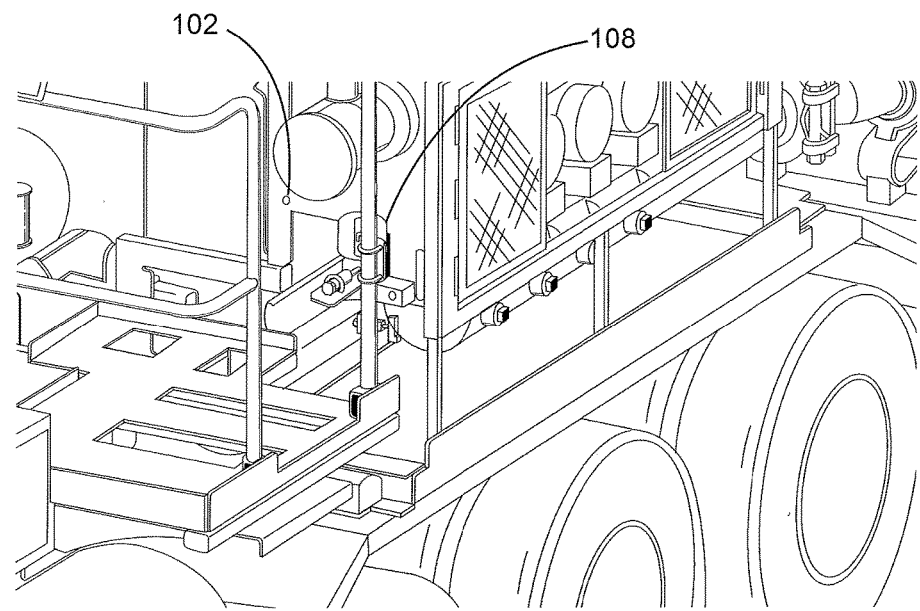
FIG. 2 illustrates a side view of a system for tracking the utilization of wellbore servicing equipment in accordance with an embodiment of the present disclosure.

Referring now to FIG. 2, the system may further include one or more identification antennas, such as an RFID antenna 108, placed in close proximity to the RFID tag 102. For example, in one exemplary embodiment in accordance with the present disclosure, the RFID antenna 108 may be required to be placed within a few feet of the RFID tag 102. The RFID antenna 108 may sense the unique identification code of the RFID tag 102 associated with the specific piece of wellbore servicing equipment 110, from the RFID tag 102 via a radio frequency ("RF") signal. In certain embodiments in accordance with the present disclosure, the one or more RFID antennas 108 may be coupled to the one or more RFID tag readers 104 via coaxial cables or by a wireless connection. In other embodiments, each RFID antenna 108 and each RFID tag reader 104 may be built together as one integrated package. In accordance with the present disclosure, the RFID antenna 108 may transmit the unique identification code from the RFID tag 102 to the RFID tag reader 104.

The RFID tag reader 104 may read the RFID tag 102 and may transmit the unique identification code of the RFID tag 102 to the information handling system 106. In certain embodiments, the unique identification code may be transmitted upon installation of the wellbore servicing equipment 110. In certain embodiments in accordance with the present disclosure, the unique identification code may be transmitted to the RFID tag reader 104 via RF signals. The unique identification code of the RFID tag 102 may be transmitted to the information handling system 106 through either the wired or wireless connection. In this manner, the information handling system 106 may record the unique identification code of the RFID tag 102 and store it in a unit utilization file (not shown) located in the central repository (not shown). All entries in the unit utilization files with the same unique identification code may designate the total utilization for the particular piece of wellbore servicing equipment 110 coupled to that RFID tag 102. Specifically, the total utilization of a piece of wellbore servicing equipment 110 may be used to determine a "remaining life" estimate of the equipment or a "probability of survival" estimate of the equipment. As discussed above, U.S. Pat. No. 8,347,957, by Stanley Stephenson et al., incorporated by reference herein, discloses a method of determining "remaining life" and "probability of survival" estimates. Other methods of calculating these estimates known to those of skill in the art having the benefit of the present disclosure may be used without departing from the scope of the present disclosure.

As would further be appreciated by one of ordinary skill in the art with the benefit of the present disclosure, a hardware device may be may be used in place of the RFID tag 102 to transmit the unique identification code from the wellbore servicing equipment 110 to the information handling system 106. The hardware device may be a "USB drive," which is a data storage device that includes flash memory with an integrated Universal Serial Bus (USB) interface. The hardware device may be coupled to the wellbore servicing equipment 110. The hardware device may further be coupled to the information handling system 106, and may provide for automatic entry of the unique identification code in the unit utilization file (not shown) located in the central repository (not shown).

As would be understood by one of ordinary skill in the art with the benefit of this disclosure, various methods of automatically tracking the utilization of a piece of wellbore servicing equipment are provided by the present disclosure. In one illustrative embodiment, with further reference to FIGS. 1 and 2, the RFID tag 102 may be coupled to the wellbore servicing equipment 110. The unique identification code of the RFID tag 102 may then be transmitted from the RFID tag 102 to the RFID antenna 108 located in close proximity to the RFID tag 102. As a next step, the unique identification code may be transmitted from the RFID antenna 108 to the RFID tag reader 104. In certain embodiments, the unique identification code may be transmitted from the RFID antenna 108 to the RFID tag reader 104 upon installation of the wellbore servicing equipment 110. In certain embodiments, the unique identification code may be transmitted from the RFID antenna 108 to the RFID tag reader 104 via radio frequency signals. The unique identification code then may be transferred from the RFID tag reader 104 to the information handling system 106. Additionally, the unique identification code may be stored in a database in the information handling system 106. In certain embodiments, the database may be a central repository having at least one unit utilization file. In certain embodiments, the unique identification code may be stored in at least one unit utilization file located in the central repository.

In one illustrative embodiment, with further reference to FIGS. 1 and 2, a method of automatically tracking the utilization of a piece of wellbore servicing equipment may include the step of reading the unique identification code from the RFID tag 102. The unique identification code may then be associated with any one or more pieces of unique identifying information of a piece of wellbore servicing equipment 110 to which the RFID tag 102 is coupled. This associating of the unique identification code with any one or more pieces of unique identifying information of a piece of wellbore servicing equipment 110 may occur in the central repository. The central repository may include an end of life estimate and a probability of failure estimate associated with a piece of wellbore servicing equipment 110.

As would further be appreciated by one of ordinary skill in the art with the benefit of the present disclosure, systems and methods of automatically tracking the utilization of wellbore servicing equipment are disclosed herein. The identification tag may provide for accurate and timely entries of installation dates for wellbore servicing equipment. For example, as a piece of equipment is moved from one unit to another, the unique identification code associated with the RFID tag coupled to that particular piece of equipment will be stored in the unit utilization file of the new unit upon each installation. As would further be appreciated by one of ordinary skill in the art with the benefit of the present disclosure, automatic entry of the unique identification code upon installation of each piece of wellbore servicing equipment may significantly reduce or eliminate human error from traditional data entry. Further, automatic entry provides for the capture of total utilization regardless of how many times the equipment is moved, and regardless of whether the equipment is moved from one unit to another. The present disclosure may provide for minimized cost of ownership of wellbore servicing equipment. Accurate and timely entries of installation dates for the wellbore servicing equipment may provide a manner of identifying the equipment with longer "remaining life" and "probability of survival" estimates, and thus identifying preferred vendors of equipment. Additionally, the systems and methods disclosed herein may assist with the forecasting of spare parts needed based on the tracked level of utilization of the wellbore servicing equipment in accordance with the present disclosure. Finally, when used to calculate the probability of completing a job with a certain piece of equipment, the present disclosure may allow for optimization of the amount of standby horsepower required to complete the job.

An embodiment of the present disclosure is a system for automatically tracking the utilization of a piece of wellbore servicing equipment. The system includes an identification tag coupled to the wellbore servicing equipment. The system also includes one or more identification antennas located in close proximity to the identification tag, and one or more identification tag readers for receiving one or more signals from the one or more identification antennas. Preferably, the system further includes an information handling system coupled to the one or more identification tag readers. The information handling system includes computer-readable media, and the computer-readable media is programmed to store a database. Optionally, the database is a central repository with at least one unit utilization file.

Preferably, at least one identification tag reader in the system is coupled to the information handling system by one of a wired or wireless connection. Optionally, at least one identification tag reader is located within the information handling system. Preferably, the identification tag includes a unique identification code. Optionally, the unique identification code is stored in at least one unit utilization file. Preferably, the wellbore servicing equipment is selected from a group consisting of a trailer, a truck, an engine, a transmission, a pump, a power end on a pump, and a fluid end on a pump. Optionally, the wellbore servicing equipment is a fluid end of a pump, and the identification tag is coupled to the fluid end.

Preferably, at least one identification antenna is located within a few feet of the identification tag and the at least one identification antenna receives at least one signal from the identification tag. Preferably, the one or more identification antennas are coupled to the one or more identification tag readers. Optionally, the one or more identification antennas are coupled to the one or more identification tag readers via coaxial cables.

Another embodiment of the present disclosure is a method of automatically tracking the utilization of a piece of wellbore servicing equipment. The method includes coupling an identification tag to the wellbore servicing equipment. The method further includes transmitting a unique identification code from an identification tag to one or more identification antennas located in close proximity to the identification tag. The method further includes transmitting the unique identification code from the one or more identification antennas to one or more identification tag readers. The method further includes transferring the unique identification code from the one or more identification tag readers to an information handling system coupled to the one or more identification tag readers.

Preferably, the unique identification code is transmitted from the one or more identification antennas to the one or more identification tag readers upon installation of the wellbore servicing equipment. Optionally, transmitting the unique identification code from the one or more identification antennas to the one or more identification tag readers is done via radio frequency signals. Preferably, the information handling system includes a computer-readable media and the computer-readable media is programmed so as to store a database. Optionally, the database is a central repository having at least one unit utilization file. Optionally, the method further includes storing the unique identification code in the central repository.

Another embodiment of the present disclosure is a method of automatically tracking the utilization of a piece of wellbore servicing equipment. The method includes reading a unique identification code from an identification tag, and associating the unique identification code with any one or more pieces of unique identifying information of a piece of wellbore servicing equipment to which the identification tag is coupled. Optionally, associating the unique identification code with any one or more pieces of unique identifying information of a piece of wellbore servicing equipment takes place at least in part in a central repository. Optionally, the central repository includes any one or more of an end of life estimate and a probability of failure estimate associated with the piece of wellbore servicing equipment.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. The terms in the claims have their plain, ordinary meaning unless otherwise explicitly and clearly defined by the patentee.

What is claimed is:

1. A system for automatically tracking a utilization of a piece of wellbore servicing equipment comprising:
    an identification tag coupled to the wellbore servicing equipment;
    one or more identification antennas located in close proximity to the identification tag;
    one or more identification tag readers for receiving one or more signals from the one or more identification antennas;
    an information handling system, coupled to the one or more identification tag readers, for determining any one or more of an end of life estimate and a probability of failure estimate associated with the piece of wellbore servicing equipment to forecast a number of spare pieces of wellbore servicing equipment to perform a wellbore servicing operation; and
    a utilization file, wherein the utilization file is stores on the information handling system, wherein the utilization file comprises one or more entries associated with the identification tag, wherein the one or more entries associated with the identification tag designate a total utilization for the wellbore servicing equipment, and wherein at least one of the remaining life estimate and the probability of survival of the wellbore servicing equipment is based on the total utilization of the wellbore servicing equipment.

2. The system of claim 1, wherein the information handling system further comprises computer-readable media programmed so as to store a database thereon.

3. The system of claim 2, wherein the database is a central repository comprising at least one unit utilization file.

4. The system of claim 2, wherein at least one identification tag reader is coupled to the information handling system by one of a wired or wireless connection.

5. The system of claim 2, wherein at least one identification tag reader is located within the information handling system.

6. The system of claim 3, wherein the identification tag comprises a unique identification code.

7. The system of claim 6, wherein the unique identification code is stored in at least one unit utilization file.

8. The system of claim 1, wherein the wellbore servicing equipment is selected from a group consisting of a trailer, a truck, an engine, a transmission, a pump, a power end on a pump, and a fluid end on a pump.

9. The system of claim 1, wherein the wellbore servicing equipment is a fluid end of a pump and wherein the identification tag is coupled to the fluid end.

10. The system of claim 1, wherein at least one identification antenna is located within a few feet of the identification tag and wherein the at least one identification antenna receives at least one signal from the identification tag.

11. The system of claim 1, wherein the one or more identification antennas are coupled to the one or more identification tag readers.

12. The system of claim 1, wherein the one or more identification antennas are coupled to the one or more identification tag readers via coaxial cables.

13. A method of automatically tracking a utilization of a piece of wellbore servicing equipment comprising the steps of:
    coupling an identification tag to the wellbore servicing equipment;
    transmitting a unique identification code from an identification tag to one or more identification antennas located in close proximity to the identification tag;
    transmitting the unique identification code from the one or more identification antennas to one or more identification tag readers;
    transferring the unique identification code from the one or more identification tag readers to an information handling system coupled to the one or more identification tag readers;
    determining a total utilization based on a unit utilization file, wherein the utilization file is stored on the information handling system, wherein the utilization file comprises one or more entries associated with the identification tag, wherein the one or more entries associated with the identification tag designate a total utilization for the wellbore servicing equipment; and
    determining any one or more of an end of life estimate and probability of failure estimate associated with the piece of wellbore servicing equipment to forecast a number of spare pieces of wellbore servicing equipment to perform a wellbore servicing operation, wherein at least one of the remaining life estimate and the probability of survival of the wellbore is based on the total utilization of the wellbore servicing equipment.

14. The method of claim 13, wherein the unique identification code is transmitted from the one or more identification antennas to the one or more identification tag readers upon installation of the wellbore servicing equipment.

15. The method of claim 13, wherein transmitting the unique identification code from the one or more identification antennas to the one or more identification tag readers is done via radio frequency signals.

16. The method of claim 13, wherein the information handling system comprises computer-readable media programmed so as to store a database thereon.

17. The method of claim 16, wherein the database is a central repository having at least one unit utilization file, and further comprising storing the unique identification code in the central repository.

18. A method of automatically tracking a utilization of a piece of wellbore servicing equipment comprising the steps of:
reading a unique identification code from an identification tag;
associating the unique identification code with any one or more pieces of unique identifying information of a piece of wellbore servicing equipment to which the identification tag is coupled; and
determining a total utilization based on a unit utilization file, wherein the utilization file is stored on the information handling system, wherein the utilization file comprises one or more entries associated with the identification tag, wherein the one or more entries associated with the identification tag designate a total utilization for the wellbore servicing equipment; and
determining any one or more of an end of life estimate and a probability of failure estimate associated with the piece of wellbore servicing equipment to forecast a number of spare pieces of wellbore servicing equipment to perform a wellbore servicing operation, wherein at least one of the remaining life estimate and the probability of survival of the wellbore is based on the total utilization of the wellbore servicing equipment.

19. The method of claim 18, wherein associating the unique identification code with any one or more pieces of unique identifying information of a piece of wellbore servicing equipment takes place at least in part in a central repository.

20. The method of claim 18, wherein determining any one or more of an end of life estimate and a probability of failure estimate associated with the piece of wellbore servicing equipment takes place at least in part in a central repository.

* * * * *